United States Patent
Arata et al.

(10) Patent No.: US 12,421,638 B2
(45) Date of Patent: Sep. 23, 2025

(54) MAKING SOFT FABRIC TOUCH FASTENERS

(71) Applicant: Velcro IP Holdings LLC, Manchester, NH (US)

(72) Inventors: Stephen R. Arata, Kingston, NH (US); Gregory K. Kopanski, Candia, NH (US)

(73) Assignee: Velcro IP Holdings LLC, Manchester, NH (US)

( * ) Notice: Subject to any disclaimer, the term of this patent is extended or adjusted under 35 U.S.C. 154(b) by 206 days.

(21) Appl. No.: 16/800,418

(22) Filed: Feb. 25, 2020

(65) Prior Publication Data

US 2020/0277718 A1    Sep. 3, 2020

Related U.S. Application Data

(60) Provisional application No. 62/911,509, filed on Oct. 7, 2019, provisional application No. 62/811,839, filed on Feb. 28, 2019.

(51) Int. Cl.
*D06C 27/00*    (2006.01)
*A44B 18/00*    (2006.01)
(Continued)

(52) U.S. Cl.
CPC .......... *D06C 27/00* (2013.01); *A44B 18/0019* (2013.01); *B29C 51/004* (2013.01);
(Continued)

(58) Field of Classification Search
CPC ............................................... B29L 2031/729
See application file for complete search history.

(56) References Cited

U.S. PATENT DOCUMENTS 2,706,324 A    4/1955    Cogovan
3,387,345 A *  6/1968    Savoir .................. A44B 18/003
                                                    24/446
(Continued)

FOREIGN PATENT DOCUMENTS

DE    3006805    9/1981
EP    0211564    2/1992
(Continued)

OTHER PUBLICATIONS

"Laser." Wikipedia, Wikimedia Foundation, Jan. 31, 2019, web.archive.org/web/20190131091515/en.wikipedia.org/wiki/Laser#Continuous_and_pulsed_modes_of_operation. (Year: 2019).*
(Continued)

*Primary Examiner* — Alison L Hindenlang
*Assistant Examiner* — Andres E. Behrens, Jr.
(74) *Attorney, Agent, or Firm* — Fish & Richardson P.C.

(57) ABSTRACT

Methods of making a male touch fastener product, by shearing distal portions of loops extending from a side of a flexible fabric, leaving fibers extending from the side of the flexible fabric in place of the sheared loops, the fibers extending to respective free distal ends, while leaving other loops extending from the side of the fabric intact, and then heating the distal ends with energy supplied by a linear energy source, such that resin of the distal ends flows to form enlarged heads on the extending fibers, while leaving at least some of the other loops intact. A male touch fastener product has fibers that form both loops and fiber segments extending from the base to respective distal fiber ends spaced from the base. Each distal fiber end forms an enlarged head of fiber resin for snagging other fibers.

30 Claims, 10 Drawing Sheets

(51) Int. Cl.
| | |
|---|---|
| *B29C 51/00* | (2006.01) |
| *B29C 69/00* | (2006.01) |
| *D04H 1/00* | (2006.01) |
| *D04H 1/46* | (2012.01) |
| *D04H 1/732* | (2012.01) |
| *D04H 11/00* | (2006.01) |
| *D04H 11/08* | (2006.01) |
| *D06C 7/00* | (2006.01) |
| *D06C 11/00* | (2006.01) |
| *D06C 13/00* | (2006.01) |
| *D06C 13/08* | (2006.01) |
| *B29L 31/00* | (2006.01) |

(52) U.S. Cl.
CPC ............ *B29C 69/001* (2013.01); *D04H 1/46* (2013.01); *D04H 1/732* (2013.01); *D04H 11/08* (2013.01); *D06C 7/00* (2013.01); *D06C 11/00* (2013.01); *D06C 13/08* (2013.01); *B29L 2031/729* (2013.01)

(56) References Cited

U.S. PATENT DOCUMENTS

| | | | | |
|---|---|---|---|---|
| 3,634,646 | A * | 1/1972 | Berger | D06C 13/08 |
| | | | | 219/121.67 |
| 3,950,587 | A | 4/1976 | Colijn et al. | |
| 4,010,302 | A | 3/1977 | Anderson et al. | |
| 4,154,889 | A | 5/1979 | Platt | |
| 4,258,094 | A | 3/1981 | Benedyk | |
| 4,324,824 | A | 4/1982 | Narens et al. | |
| 4,379,189 | A | 4/1983 | Platt | |
| 4,439,476 | A | 3/1984 | Guild | |
| 4,548,116 | A * | 10/1985 | Yoshida | A44B 18/0026 |
| | | | | 26/9 |
| 4,770,917 | A * | 9/1988 | Tochacek | B32B 5/02 |
| | | | | 442/388 |
| 5,216,790 | A | 6/1993 | Eschenbach | |
| 5,265,954 | A | 11/1993 | Keil | |
| 5,369,852 | A * | 12/1994 | Higashinaka | A44B 18/0088 |
| | | | | 24/448 |
| 5,407,439 | A * | 4/1995 | Goulait | H01M 6/505 |
| | | | | 604/391 |
| 5,630,896 | A | 5/1997 | Corbin et al. | |
| 5,729,793 | A * | 3/1998 | Inoue | B41J 29/12 |
| | | | | 399/92 |
| 5,745,961 | A * | 5/1998 | Okawa | A44B 18/0023 |
| | | | | 24/442 |
| 5,785,784 | A * | 7/1998 | Chesley | B29C 43/46 |
| | | | | 51/297 |
| 5,891,547 | A | 4/1999 | Lawless | |
| 6,086,984 | A | 7/2000 | DiMaggio et al. | |
| 6,217,693 | B1 * | 4/2001 | Pelham | A44B 18/0011 |
| | | | | 156/229 |
| 6,329,016 | B1 | 12/2001 | Shepard et al. | |
| 6,592,800 | B1 * | 7/2003 | Levitt | B29C 67/0044 |
| | | | | 264/479 |
| 6,642,160 | B1 | 11/2003 | Takahashi | |
| 6,783,834 | B2 | 8/2004 | Shepard et al. | |
| 6,893,525 | B1 | 5/2005 | Schmidt et al. | |
| 7,117,571 | B2 | 10/2006 | Dilo | |
| 7,156,937 | B2 | 1/2007 | Provost et al. | |
| 7,465,366 | B2 | 12/2008 | Provost et al. | |
| 7,547,469 | B2 | 6/2009 | Provost et al. | |
| 7,562,426 | B2 | 7/2009 | Barker et al. | |
| 8,500,940 | B2 | 8/2013 | Shepard et al. | |
| 8,673,097 | B2 | 3/2014 | Barker et al. | |
| 8,753,459 | B2 | 6/2014 | Provost et al. | |
| 9,210,970 | B2 * | 12/2015 | Collins | A44B 18/0019 |
| 9,388,519 | B1 | 7/2016 | Gallant et al. | |
| 9,790,626 | B2 | 10/2017 | Gallant et al. | |
| 2002/0160143 | A1 | 10/2002 | Shepard et al. | |
| 2002/0185192 | A1 * | 12/2002 | Wang | A44C 5/0053 |
| | | | | 139/391 |
| 2004/0157036 | A1 * | 8/2004 | Provost | D04H 11/00 |
| | | | | 428/85 |
| 2005/0091805 | A1 * | 5/2005 | Armela | A44B 18/0065 |
| | | | | 24/452 |
| 2005/0101930 | A1 * | 5/2005 | Tachauer | A61F 13/622 |
| | | | | 604/391 |
| 2005/0196581 | A1 | 9/2005 | Provost et al. | |
| 2005/0208259 | A1 | 9/2005 | Provost et al. | |
| 2005/0217092 | A1 | 10/2005 | Barker et al. | |
| 2006/0019572 | A1 * | 1/2006 | Lester, Jr. | A61F 13/627 |
| | | | | 428/196 |
| 2006/0149210 | A1 | 7/2006 | Sawyer et al. | |
| 2006/0200951 | A1 * | 9/2006 | Provost | A44B 18/0049 |
| | | | | 24/452 |
| 2006/0225258 | A1 | 10/2006 | Barker et al. | |
| 2008/0113152 | A1 | 5/2008 | Provost et al. | |
| 2008/0193709 | A1 * | 8/2008 | Han | B32B 3/22 |
| | | | | 139/391 |
| 2011/0253289 | A1 | 10/2011 | Shepard | |
| 2012/0151722 | A1 * | 6/2012 | Hertlein | A44B 18/0065 |
| | | | | 264/293 |
| 2013/0052399 | A1 | 2/2013 | Barker | |
| 2013/0052403 | A1 * | 2/2013 | Barker | A44B 18/0023 |
| | | | | 26/9 |
| 2014/0103567 | A1 * | 4/2014 | Collins | B29C 43/46 |
| | | | | 24/451 |
| 2017/0282499 | A1 * | 10/2017 | LaRocco | B32B 5/028 |
| 2018/0140057 | A1 * | 5/2018 | Kopanski | A44B 18/0065 |
| 2021/0196938 | A1 * | 7/2021 | Tamaki | B29C 33/405 |

FOREIGN PATENT DOCUMENTS

| | | | | |
|---|---|---|---|---|
| EP | 0780066 | | 6/1997 | |
| EP | 0780505 | | 6/1997 | |
| EP | 1276348 | | 1/2003 | |
| EP | 1279348 | | 1/2003 | |
| GB | 1228431 | | 4/1971 | |
| GB | 1345607 | * | 4/1971 | ......... A44B 18/0007 |
| JP | 7171011 | | 7/1995 | |
| JP | 09-000317 | | 1/1997 | |
| WO | WO 2001080680 | | 11/2001 | |
| WO | WO 2015096877 | | 7/2015 | |

OTHER PUBLICATIONS

"Units of Textile Measurement—Wikipedia." Wikipedia, Dec. 20, 2016, https://web.archive.org/web/20161220191659/https://en.wikipedia.org/wiki/Units_of_textile_measurement (Year: 2016).*

Industrial Strength Marketing, William Golden, Brenth Lathrop 2011. "Choosing the Right Nonwoven | Fabric Sourcing | Fiberweb®." Avintiv, Jan. 12, 2018, www.technicalnonwovens.com/choosing-the-right-nonwoven. (Year: 2011).*

GB-1,345,607 Billarant) Apr. 1971 (online machine translation), [Retrieved on Jan. 30, 2023]. Retrieved from: Espacenet (Year: 1971).*

PCT 2nd Written Opinion in International Appln. No. PCT/EP2020/055290, dated Feb. 10, 2021, 7 pages.

PCT International Search Report and Written Opinion in International Application No. PCT/EP2016/051911, dated May 13, 2016, 11 pages.

PCT International Search Report and Written Opinion in International Application No. PCT/EP2020/055290, dated May 26, 2020, 11 pages.

Extended European Search Report in European Appln. No. 22186395.4, dated Oct. 27, 2022, 6 pages.

* cited by examiner

MAKING SOFT FABRIC TOUCH FASTENERS

TECHNICAL FIELD

This invention relates to fabric touch fasteners and methods of making them, and more particularly to flexible fabric touch fasteners with particularly soft surface feel.

BACKGROUND

Touch fasteners have complementary surfaces that come together to create a fastening, usually a releasable one, by making a large number of respective engagements between corresponding discrete features on the two surfaces. This contrasts with adhesive fastening in which two broad surfaces engage one another but not by engagement of discrete features. The most common form of touch fasteners fasten by engaging a field of discrete male fastener elements and a field of discrete female fastener elements, such as hooks engaging loops. But the male fastener elements may be configured as stems with enlarged heads that snag female discrete fastener elements in the form of fibers secured at two points to form an engageable fiber segment, such as a non-woven material. Touch fasteners are used on both disposable and durable garments, among other things. The fastening performance of touch fasteners is generally measured in terms of peel and shear strength. It is desired to make touch fasteners with sufficient performance to secure two items together for a particular application, while making the two mating surfaces as soft as possible.

SUMMARY

Several aspects of the invention feature methods of making a male touch fastener product, by shearing distal portions of loops extending from a side of a flexible fabric, leaving fibers extending from the side of the flexible fabric in place of the sheared loops, the fibers extending to respective free distal ends, while leaving other loops extending from the side of the fabric intact, and then heating the distal ends with energy supplied by a linear energy source, such that resin of the distal ends flows to form enlarged heads on the extending fibers, while leaving at least some of the other loops intact.

By 'linear energy source' I mean an energy source that emits energy from a very thin line, such as a laser beam or a hot wire, as opposed to an iron or oven, for example.

By loops 'extending from' the side of the base I mean to include loops that may normally lie in a plane of the side of the fabric but that are extended at the point of sheering, as well as loops that extend from the fabric side in an unloaded state.

According to one aspect of the inventive method, the sheared loops are of fibers having a denier of less than about 10, preferably above 5.

According to another aspect of the inventive method, the shearing and heating leave intact at least 10 percent (preferably, at least 20 percent; more preferably, at least 30 percent) of the loops extending from the side of the flexible fabric prior to shearing.

According to yet another aspect of the inventive method, as a result of the shearing and heating the flexible fabric has both headed fibers and functional loops extending from the side of the flexible fabric. Preferably the flexible fabric has more headed fibers than functional loops extending from the side of the flexible fabric. By 'functional loop' I mean that the loop does not lie flat against the surface of the fabric, but extends away from the surface so as to form a gap between the fabric surface and a distal portion of the loop, so as to form part of a compliant loop pile on one side of the fabric and/or receive hooking members for releasable fastening.

According to yet another aspect of the inventive method, at least some of the enlarged heads are disposed closer to the side of the flexible fabric than portions of the intact loops.

The various aspects of the inventive method may include one or more of the following features.

In some embodiments, the sheared loops are of fibers having a diameter of less than about 50 µm, preferably between 20 and 40 µm.

In some examples, the enlarged heads have a lateral extent between 2.5 and 6.0 times the later extent of the fiber (such as fiber diameter).

In some cases, the fabric comprises (or is) a needled non-woven material. In some cases, the fabric comprises (or is) an airlaid non-woven material. For some applications, the non-woven material has a basis weight of between 40 and 60 grams per square meter (GSM). For some other applications, the non-woven material has a basis weight of between 60 and 80 GSM.

In some cases, shearing the fibers comprises shearing staple fibers needled through the non-woven material. The non-woven material may have a flexible binder layer, such as disposed on a side opposite the loops or through which the loops extend. The binder layer may be or include a film.

Preferably, the fibers are of drawn amorphous polymer such as polypropylene. In some cases, the fibers are bicomponent fibers, such as fibers with a polypropylene core and a polyethylene sheath.

In some examples, the method includes, prior to shearing the distal portions of the loops, forming the flexible fabric by needling a batt of fibers. The batt of fibers may be needled into a non-woven fabric from one side of the non-woven fabric, thereby forming the loops on the opposite side of the non-woven fabric for example.

In some cases the loops to be sheared extend, just prior to shearing, between 6 and 10 mm from the side of the flexible fabric.

In some embodiments, shearing distal portions of the loops includes training the flexible fabric about a shear presentation beam adjacent a rotary shear and cutting anvil, such that the loops are engaged by the rotary shear and sheared against the cutting anvil, such as while bent around an edge of the presentation beam. In general, the flexible fabric should have other loops extending from the side of the flexible fabric and that are not sheared against the cutting anvil.

In some cases, the loops are sheared in two successive stages, with some loops sheared by a first shear, and some other loops sheared by a second shear downstream of the first shear.

The method may include, prior to shearing the loops, brushing the surface of the flexible fabric to increase a height of the loops. The method may also include, prior to brushing the surface, unrolling the flexible fabric from a roll.

In some embodiments, the linear energy source is a beam of energy directed toward the distal ends. For example, the beam of energy may be of laser light. Preferably, the beam of energy has a beam direction non-parallel to a longitudinal axis of a heat presentation shaft about which the flexible fabric is trained during heating.

In some examples, the beam of energy extends from a location that traverses a width of the fabric during heating.

Preferably, the method includes adjusting a focal point of the beam to coincide with a closest point of the beam of energy to the flexible fabric.

In some cases, heating the distal ends involves engaging the distal ends with multiple different beams of energy engaging different distal ends. For example, the multiple different beams of energy may be directed to heat distal ends in respective widths of the flexible fabric. The multiple beams of energy may be constantly redirected to traverse the respective widths of the flexible fabric, by altering an angle of each beam with respect to the flexible fabric. Preferably, the method also includes constantly altering a focal point of each beam to align with a nearest point of the beam to the flexible fabric.

In some embodiments, the beam of energy is pulsed to define alternating beam-on and beam-off periods. For example, the beam of energy may be pulsed with a duty cycle selected to cause a desired proportion of distal ends to be heated.

The method may also include, while heating the distal ends, directing a stream of air across an optical component from which the beam of energy is emitted toward the distal ends.

In some examples, the linear energy source is a heated wire. Preferably, the wire extends parallel to a longitudinal axis of the heat presentation shaft, such that the wire heats the sheared ends in a very narrow transverse region of the fabric, preferably while the fabric is supported on the heat presentation shaft.

Heating the distal ends preferably involves training the flexible fabric about a heat presentation shaft with the distal ends directed radially outward, while the distal ends are heated by the linear energy source. The linear energy source should be spaced from the heat presentation roll by a distance such that a base of the flexible fabric is not permanently altered by the linear energy source.

In some embodiments the method includes, either during or after heating the distal ends, engaging the surface of the flexible fabric with a flow of air with sufficient energy to deflect the fiber loops, such as to help redistribute the loops and heated ends such that at least many or most of the enlarged heads are disposed within a compliant bed formed by the loops.

The method may also include, after heating the distal ends, compressing the sheared and intact loops. Compressing the sheared and intact loops may involve forming the product into a roll in which the sheared and intact loops are compressed against an opposite side of the touch fastener product.

In some embodiments, the method is formed as a continuous process, producing a longitudinally continuous sheet of fastener product. In some cases, the method also includes spooling the produced sheet to form a roll.

Some other aspects of the invention feature a male touch fastener product with a flexible fabric base having a broad side, and fibers forming both loops of fibers, each loop connected to other fibers at two spaced-apart points in the base, and fiber segments extending from the base to respective distal fiber ends spaced from the base. Each distal fiber end forms an enlarged head of fiber resin for snagging other fibers. By 'loops' I mean to include fiber segments that lie generally at the surface of the base and are exposed for engagement, as well as loops that are elevated above the broad side of the fabric base.

According to one aspect of the inventive product, there are at least one-sixteenth (preferably, at least one-eighth) as many loops as fiber segments.

According to another aspect of the inventive product, the fiber segments are of a fiber diameter less than about 50 μm, and the enlarged head of each fiber segment is of a lateral width of at least 2.5 times a lateral width (e.g., diameter) of the fiber segment.

Another aspect of the invention features feature a male touch fastener product with a flexible fabric base having a broad side, and fibers forming both loops of fibers, forming a compliant loop bed defining a thickness, each loop connected at two spaced-apart points in the base, and fiber segments extending from the base to respective distal fiber ends spaced from the base. Each distal fiber end features an enlarged head of fiber resin for snagging other fibers. At least some of the enlarged heads are disposed within the thickness of the compliant loop bed.

The various aspects of the inventive product may include one or more of the following features.

In some examples, the base comprises (or is) a non-woven material. The fibers may be staple fibers needled through the non-woven material.

In some cases, the non-woven material has a flexible binder layer, which may be disposed on a side opposite the broad side or through which the fibers may extend. The binder layer may have or include a film, for example.

In some other examples, the fabric base comprises a woven base or a knit base.

Some examples of the product have an overall weight of between 40 and 60 grams per square meter, or between 60 and 80 grams per square meter. In some cases, the flexible fabric base and the fibers together have a basis weight of between 50 and 90 GSM.

In some embodiments, the fibers are of a diameter between 20 and 40 μm.

In some cases, the fibers are of a denier between 6 and 10.

The fibers are preferably of drawn amorphous polymer, such as polypropylene. In some cases the fibers are bicomponent fibers, such as fibers with a polypropylene core and a polyethylene sheath.

The enlarged heads preferably have a lateral extent between 2.5 and 6.0 times the lateral extent of the fibers.

At least some of the loops preferably extend to a height from the broad side of the base greater than an average height of the enlarged heads of the fiber segments. Preferably, at least most of the enlarged heads are disposed within a loft defined by the loops.

In some embodiments, the loops are engageable by the enlarged heads to form a releasable fastening with the product engaged to itself.

Various aspects of the invention can provide a fastening fabric with very small headed fibers dispersed in a field of fibers that presents a relatively soft surface to the touch but that is capable of snagging an appropriately configured fabric of micro-fibers to form a releasable fastening. The fastening fabric can be created from relatively inexpensive, light-weight, non-woven materials, by a sequence of shearing and heating steps that forms the small heads on some fibers while leaving other loops of fiber intact to provide a soft touch. The process of making the fastening fabric can be done on a continuous line to which the starting material is fed from a roll and from which the finished product is spooled. The process may even be performed on a continuous line beginning with forming a batt of staple fibers from a bale opener, or from a fiber card.

The fine denier of the drawn fibers from which the heads are formed is seen as advantageous in preserving the softness of the fabric, as well as allowing very rapid head formation in the presence of energy from a beam or localized heat source, without deforming much of the rest of the fiber. Shearing in advance of head formation can help in the formation of more uniform heads for fastening performance, and in retaining softness.

The details of one or more embodiments of the invention are set forth in the accompa-nying drawings and the description below. Other features, objects, and advantages of the invention will be apparent from the description and drawings, and from the claims.

DESCRIPTION OF DRAWINGS

FIGS. 10-12 show engagement with a microfiber loop material.

Like reference symbols in the various drawings indicate like elements.

DETAILED DESCRIPTION

Figure 1:
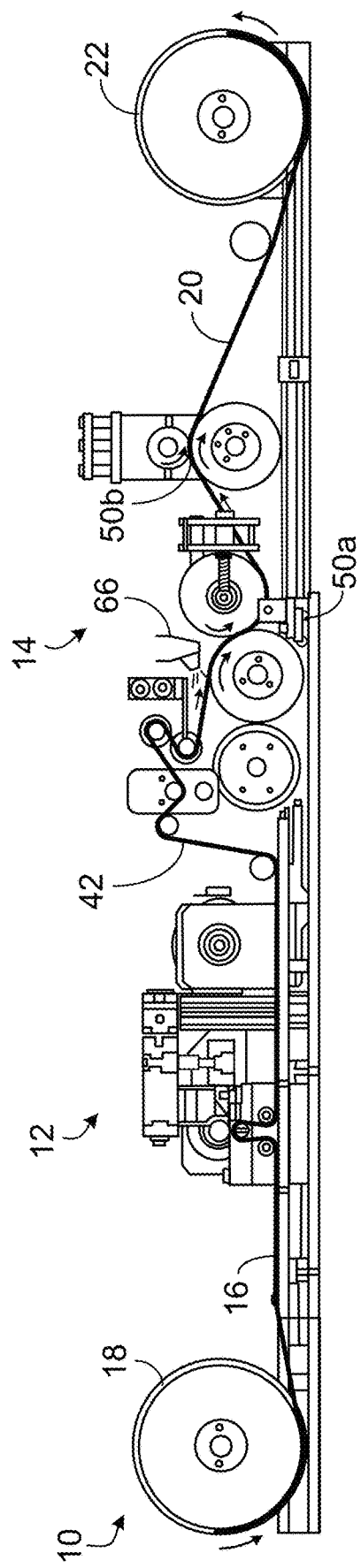
FIG. 1 is a plan view of a manufacturing system and method for making a male fabric touch fastener.

Referring first to FIG. 1, an apparatus 10 for making a fastener material has a shearing station 12 and a heading station 14 that both operate continuously and in series. A flexible fabric 16 is fed from a feed roll 18 into the shearing station, and after leaving the heading station the fastener material 20 is wound onto a takeup roll 22 for storage or transport.

The flexible fabric 16 fed into apparatus 10 may be a non-woven material produced by needling a batt of loose staple fibers, such that loops of fibers are formed on the side of the batt opposite the needled side. The height and density of the loops can be controlled by adjusting the needling density and needle penetration depth. More information on a suitable method of making such a non-woven material, and its resulting structure, can be found in U.S. Pat. No. 9,790, 626, the contents of which are incorporated herein by reference. When creating a non-woven material for flexible fabric 16, it is preferable to use a needle penetration depth of at least 7 to 8 mm, to form loops to be sheared. The fabric may be needled with different penetration depths, to create both long loops for shearing and shorter loops to remain intact during shearing of the long loops. The higher the needling density, the more loops tend to be formed. Larger needles will also tend to form more loops. For example, a 36-gage needle has a larger fork notch than a 40-gage needle, and will therefore "grab" and pull more fibers down into the brushes. I have discovered, for example, that useful product can be made from needled batts needled at 83 penetrations per square centimeter using 36-gage needles, whereas it may take needling at 137 penetrations per square centimeter with 40-gage needles to get similar performance. If the needling density is too low, an insufficient number of loops will be sheared and headed and the fastening performance may be insufficient. If the needling density is too high, adjacent fibers may fuse together during the heading process and the fastening performance may be reduced. Furthermore, over-needling the batt may result too little fiber remaining on the back-side of the product, which can reduce tear resistance and increase fiber pullout during disengagement. The optimal needling density will vary for each application, but as an example, a carded web of about 70 grams per square meter (GSM) may be needled with a needling density of about 59 to 88 penetrations per square centimeter.

The non-woven material may be comprised completely of staple fibers, with the staple fibers forming both the loops and the ground of the material. Alternatively, the non-woven material may be formed by needling staple fibers through a preformed non-woven scrim, or adding a layer of film or scrim to the needled batt prior to fusing the non-loop side of the material, to provide more structure and increase tear resistance. For example, two 25 GSM carded layers of staple fibers can be needled through a 17 GSM polypropylene spunbond non-woven material, and then the non-loop side heated for 20 seconds with a 390 degree F. iron to fuse the fibers on the side opposite the loops. In another example, a 40 GSM carded web was needled through one layer of 20 GSM spunbond at 83 punches per square centimeter using 36-gage needles, and then heated on the non-loop side for 20 seconds with a 390 degree F. iron. As discussed in more detail below, the fibers or filaments to be sheared and headed are preferably of drawn polypropylene resin.

I have found that a product created by needling fiber through one layer of scrim can be significantly more resiliently stretchable, in both the machine direction and the cross direction, than a product created entirely from staple fibers, or a product created by needling fibers through one layer of scrim and then adding a second layer of scrim on top of the needled fibers immediately before heating. Generally, the larger the needles the more resiliently stretchable the product. Also, the higher the needling density the more resiliently stretchable the product. Resilient stretchability can a desirable characteristic for several applications, in that it can enhance the perception of softness/flexibility. Furthermore, if the product is used on a stretchable substrate, such as the ear tab of a diaper, and the substrate is partially stretched while being engaged with loops, release of the stretch can generate shear load at the engagement, enhancing the fastening strength against peel loads.

When creating a product by needling through one layer of scrim, the larger the needles used and/or the higher the penetration density, the lighter/more flexible the product will feel. This is due to the increased amount of "open area" created by larger needles and/or higher penetration density. Of course, there is a point beyond which tear strength/performance will degrade with increasing open area.

Figure 15A:
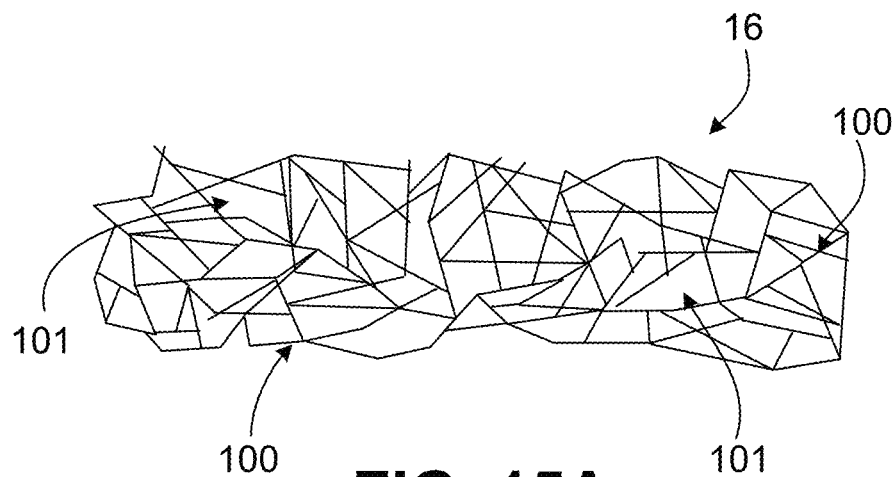
FIGS. 15A-C sequentially illustrate a method of making a fastener material from an airlaid nonwoven.
Figure 15B:
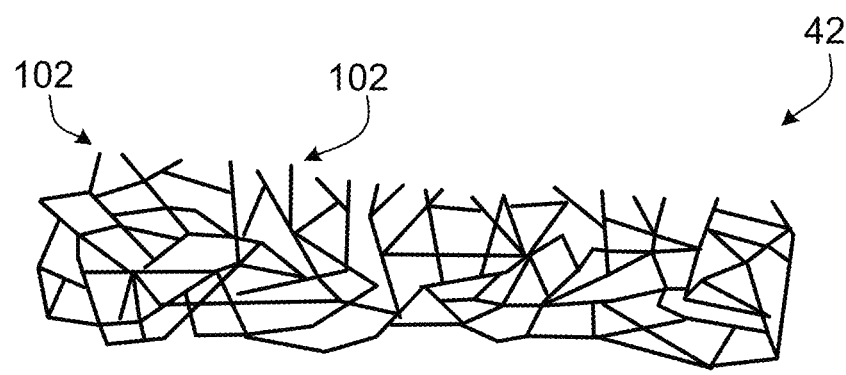
Figure 15C:
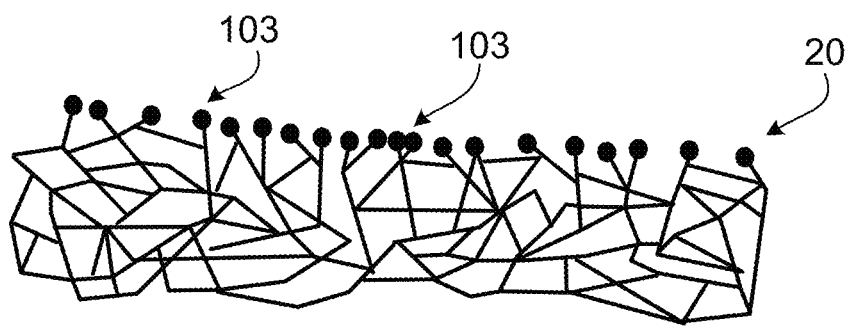

In another example illustrated in FIGS. 15A-15C, the flexible fabric 16 from which the fastener material is produced is an airlaid nonwoven. To create this flexible fabric, shortcut fibers are airlaid into a carded web batt. Due to the nature of the airlay process, fibers are randomly oriented. The batt is then bonded such that at least many places in the web where discrete fibers are touching or intersecting are fused together, forming fuse points 100. Such fusing could be obtained, for example, by passing the fabric through an oven, or binder coating and setting the fabric. After the fusing process, the resulting flexible fabric is a stable, homogeneous product that preferably has equal web strength in all directions and whose inherent nature provides some resistance to crushing forces and resilience when crushed.

Fuse points 100 connect fibers throughout the web and the fiber sections joining such fuse points define hook engageable loops 101. These loops 101 are generally distributed evenly though out the web.

Additionally, the bonding process may impart a three-dimensional texture to the web if it is bonded against a coarse, textured belt or screen. The bonding may be an embossing process, for example, leaving high loft regions of fibers surrounded by bonded borders. Providing the final fastening surface with three-dimensional contour can promote engagement and retention of fibers during use. The bonding process may also be used to attach another nonwoven, film or scrim to one side of the fabric.

Preferably, the flexible fabric made through the airlay process is created from polypropylene fibers having a denier of between 7 and 30, and the final weight of the fabric is preferably between 25 and 250 gsm. The fibers may be circular and uniform in cross-section, may be hollow, may be of a non-circular cross-section. In some cases, the fibers are bicomponent fibers, in which case the outer sheath of the fibers may form a binder that fuses fibers at the fuse points. The flexible fabric may be formed from a blend of different fibers exhibiting different characteristics.

Further, multiple airlaid batts, of similar or different construction, may be fused together to form flexible fabric 16.

Figure 2:
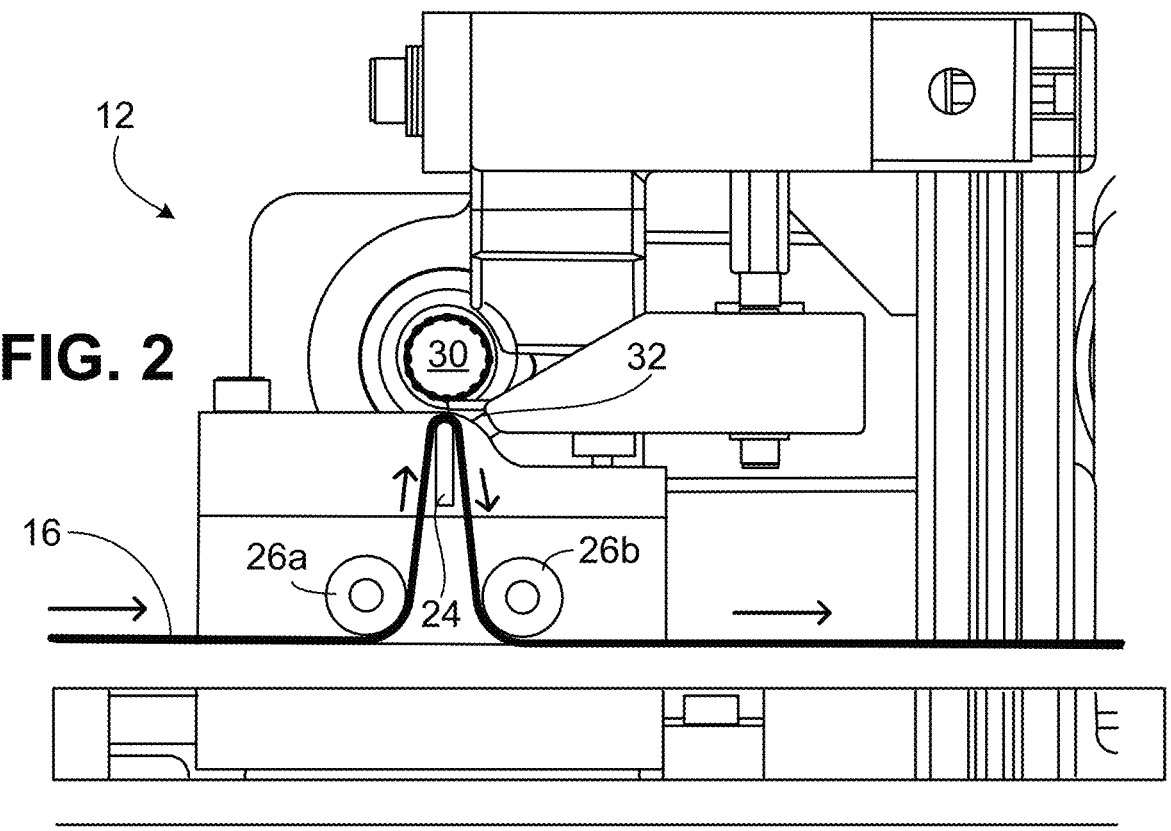
FIG. 2 is an enlarged view of the shearing station of the system of FIG. 1.
Figure 3:
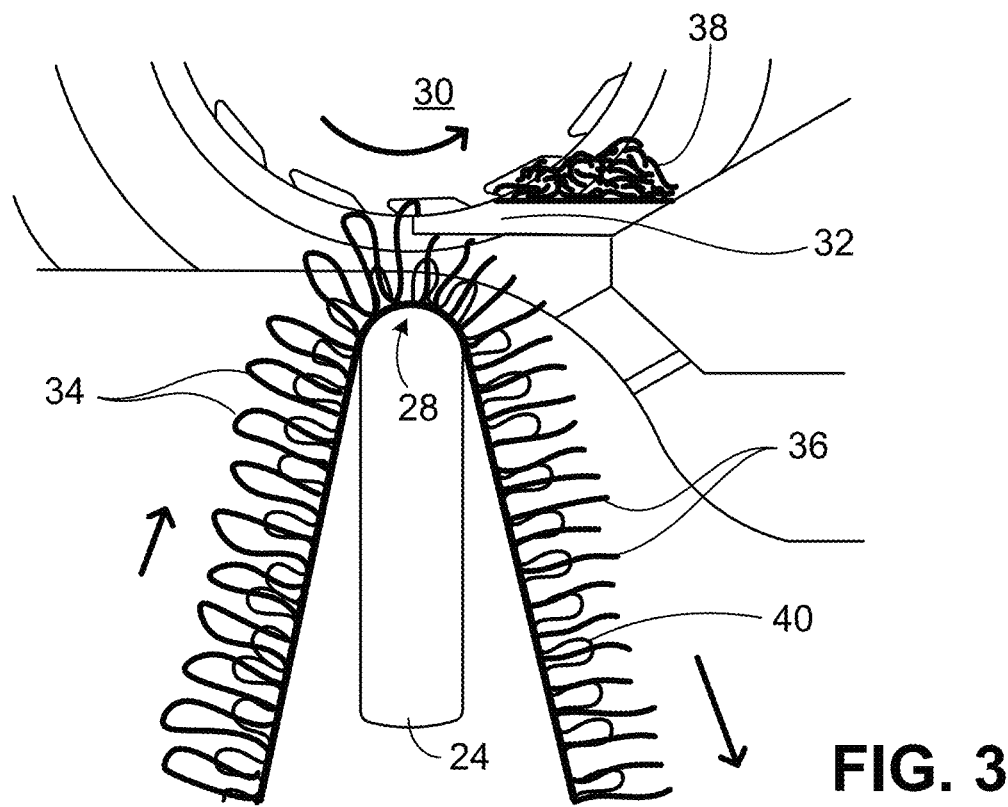
FIG. 3 shows the shearing of a loop fabric.

Referring next to FIGS. 2 and 3, the flexible fabric 16 enters shearing station 12 where the fabric is directed over a stationary shear presentation beam 24 by two idlers 26*a* and 26*b*. The fabric wraps sharply around a small-radius edge 28 of shear presentation beam 24, causing loops in that area to stand especially tall and proud of the surface. The tip edge of shear presentation beam 24 is aligned with a rotary shear 30 and cutting anvil 32, such that the tops of the tallest proud loops 34 of the bent fabric are engaged by the blades of the rotary shear and sheared against the anvil. The shearing operation is most effective when the loops are standing tall, as it ensures that a greater number of loops 34 are sheared, and to a similar height.

The rotary shear is a helical blade that cuts against the cutting anvil, rotating at a much higher surface speed than the advance rate of the fabric and shearing the taller loops 34 into standing fiber segments 36. The sheared bits 38 of fiber are collected by a vacuum system (not shown). Because the loops are not all of the same height, the shorter loops 40 are not affected by the shearing process, and remain intact through the shearing station. The height at which loops are cut is adjusted by moving the shear presentation beam 24 up or down relative to the rotary shear and cutting anvil. Raising the shear presentation beam results in shorter standing fibers, and lowering the shear presentation beam results in taller standing fibers. At high line speeds, two or more rotary shears may be arranged in sequence, to perform two or more shearing operations.

When the flexible fabric 16 is an airlayed product as seen in FIG. 15*a*, the sheared product may resemble the image depicted in FIG. 15*b* where surface level hook engaging features have been sheared, leaving hook engageable features below the shear level intact, and now resemble upstanding fibers 102.

Referring back to FIG. 1, after leaving shearing station 12 the sheared fabric 42 enters heading station 14, where the distal ends of the sheared fibers are heated to form fastener heads. Given that the heading process melts the sheared fiber ends, it may at first seem redundant to shear the fibers before heating them. However, I have found that shearing before heating can substantially improve both performance and softness, in part by aiding in the formation of distinct mushroom heads and minimizing excess resin flow during the heating phase. Omitting shearing may result in fewer useful mushroom heads and more indistinct resin nodules connecting fibers. Shearing and heating may be performed on a single continuous line as shown in FIG. 1, but alternatively the sheared fabric 42 can be spooled for later heading.

When the sheared fabric 42 is an airlayed product such as seen in FIG. 15*b*, after heading may resemble FIG. 15*c*, where the upstanding fibers 102 have been heated to form fastener heads 103.

Figure 4:
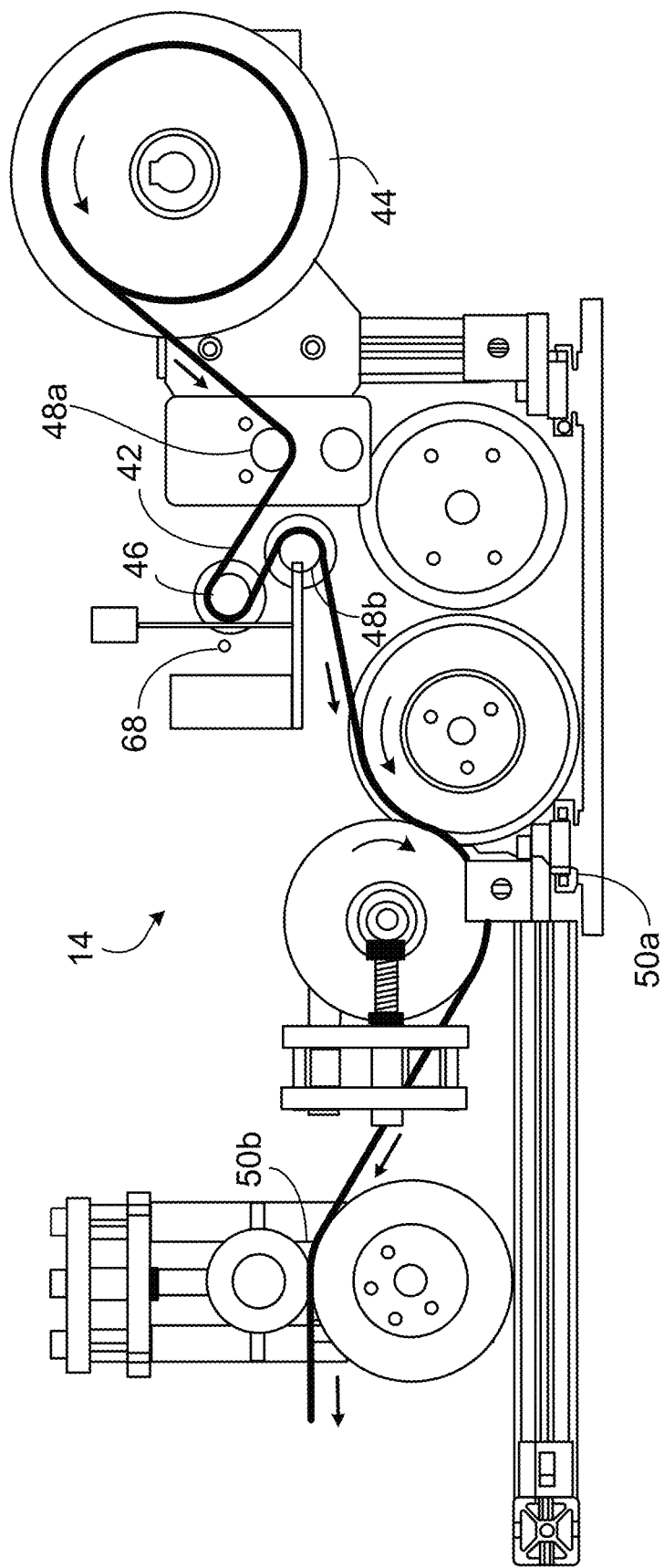
FIG. 4 is a plan view of a head-forming station.
Figure 5:
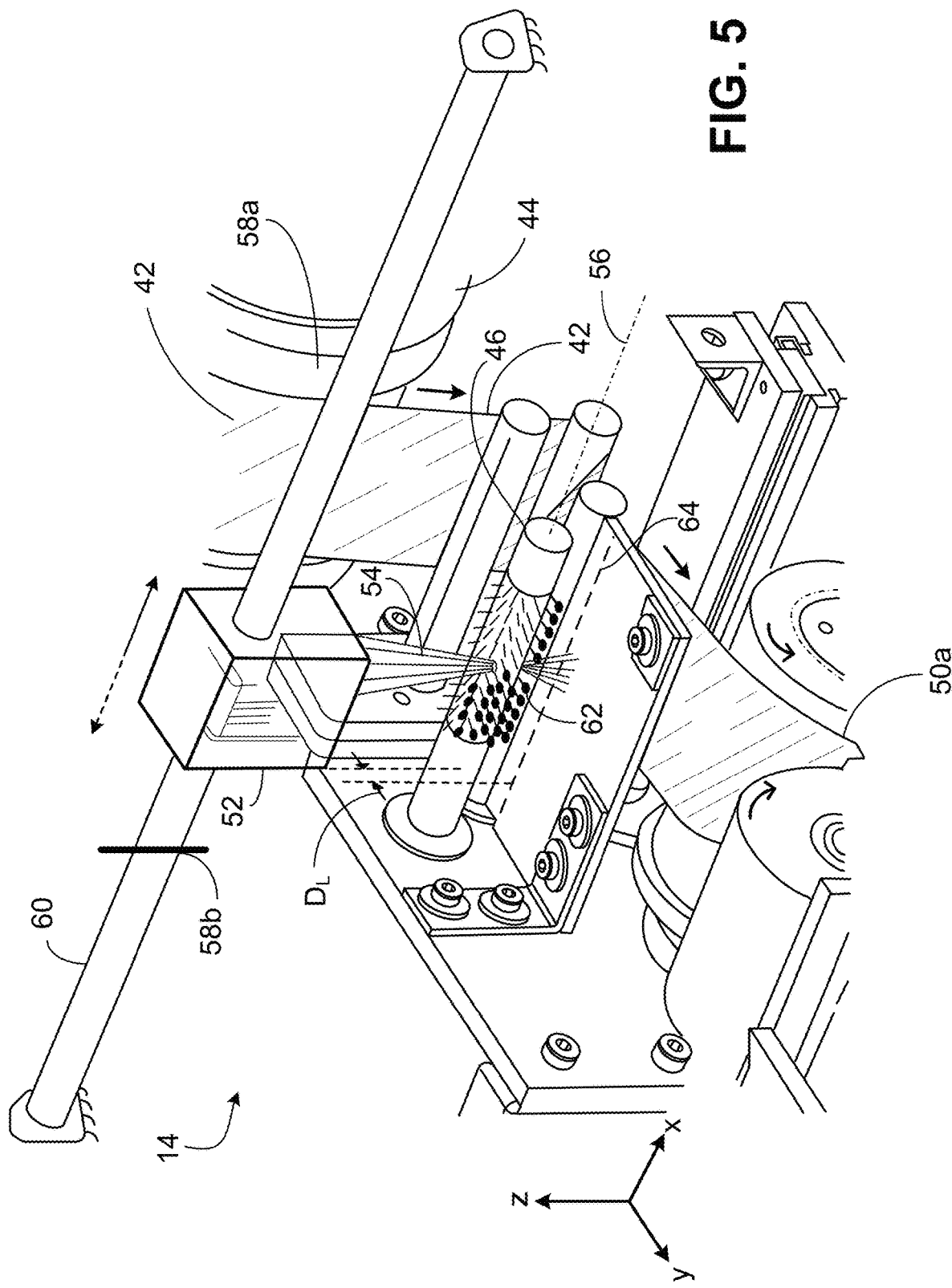
FIG. 5 is a perspective view of a portion of the station of FIG. 4, showing heating distal ends of fibers to form heads.

FIGS. 4 and 5 illustrate the same heading station 14 as in FIG. 1, but configured as a stand-alone station to which a previously sheared fabric 42 is fed from a feed roll 44. Rather than progressing left to right as in FIG. 1, the material in FIGS. 4 and 5 moves right to left. The sheared fabric 42 is wrapped over a heat presentation shaft 46 by two idlers 48*a* and 48*b*, and is advanced forward by two nips, 50*a* and 50*b*. The use of two nips ensures that the material continues to advance forward, even if there is slippage in one of the nips. Nip pressure may be controlled by springs or hydraulic/pneumatic controls to be relatively light, to avoid overly crushing the finished product.

Referring to FIG. 5, heading station 14 includes a laser 52 that emits a beam 54 spaced from the surface of the heat presentation shaft 46 so as to rapidly heat the ends of the sheared fibers to form mushroom heads. This occurs where the beam is nearest the axis 56 of the heat presentation shaft 46, where the beam axis is only a distance $D_L$ (such as, for example, 0.15 to 2.5 mm) from the surface of the shaft. In this example, the laser remains on continuously as the fabric advances and the laser moves back and forth across the fabric along rod 60, between laser travel stops 58*a* and 58*b*. The fabric advance may be dwelled while the laser traverses between its stops, or may advance while the laser moves such that the heading path of the laser is at an angle to the longitudinal direction of the fabric. If the fabric advance is held during laser traverse, there will be a discrete length of the fabric in which distal fiber ends are affected by the laser to form mushroom heads, and the overall fastening performance can be varied by varying the increment of advance between passes of the laser. The laser beam width is exaggerated in FIG. 5 to illustrate that the beam is controlled to have a focal point 62 aligned with the elevation of the heat presentation shaft axis 56. It is at this point that the beam power is most focused, and preferably coincides with where the fiber ends are closest to the beam. Once having passed the fabric, the beam diverges until incident on a beam blocking plate 64.

There are several adjustable parameters in the laser-heating process:

Spacing-between-cuts: this controls the increment that the web advances between laser passes, and as such, controls how close together adjacent passes are. If adjacent passes are too close, excessive heat can deform mushroom heads and/or cause resin of adjacent fibers to merge together. If adjacent passes are too far apart, fastening performance is degraded.

Laser cut height: this controls how close the laser beam 54 gets to the fabric (related to distance $D_L$). If the laser is positioned closer to the tangency area, upstanding fibers will be cut an additional amount by the laser before being mushroomed. If positioned too close, fibers will become severely melted and the backing of the web can become partially melted or deteriorated. If the laser beam is positioned too far away, the fibers will not receive enough heat to mushroom adequately, if at all. Ideally, the majority of headed fibers are headed, but not cut, by the laser beam.

Laser focus: this controls the position of the laser focal point 62 relative to the heat presentation shaft along the beam axis.

Laser speed: this controls the speed at which laser 52 travels back and forth between the laser travel stops 58$a$ and 58$b$.

Laser power: this controls the power/intensity of the laser beam. In this example, a 75 watt $CO_2$ laser is operated at 20% power (for an effective 15 watts of beam power), but the optimal laser power will be a function of the fiber material and structure, as well as other process parameters. As a comparison, hollow polypropylene fibers of around 7 denier will mushroom well with such a laser at a given line and laser speed with the laser set to between 11 and 20 percent power, whereas in a similar process solid polypropylene fibers of the same denier tend to mushroom well with the laser set to between 2 and 11 percent power, with the heads beginning to become bulbous or elongated at powers in excess of 11 percent.

Laser pulse frequency: the laser may be operated in a pulse mode to control how frequently the laser beam is present adjacent the sheared fiber ends. In cases where it is desirable to decrease fastening strength, or further increase perceived softness, the laser can be operated with a reduced duty cycle.

At higher line speeds (of up to, for example, 30 meters/minute), it may be necessary to employ multiple lasers simultaneously in order to form a desired number of heads across a wide fabric. Such lasers can each be arranged to only impact a fraction of the fabric width, and can be spaced apart along the processing direction.

Figure 6:
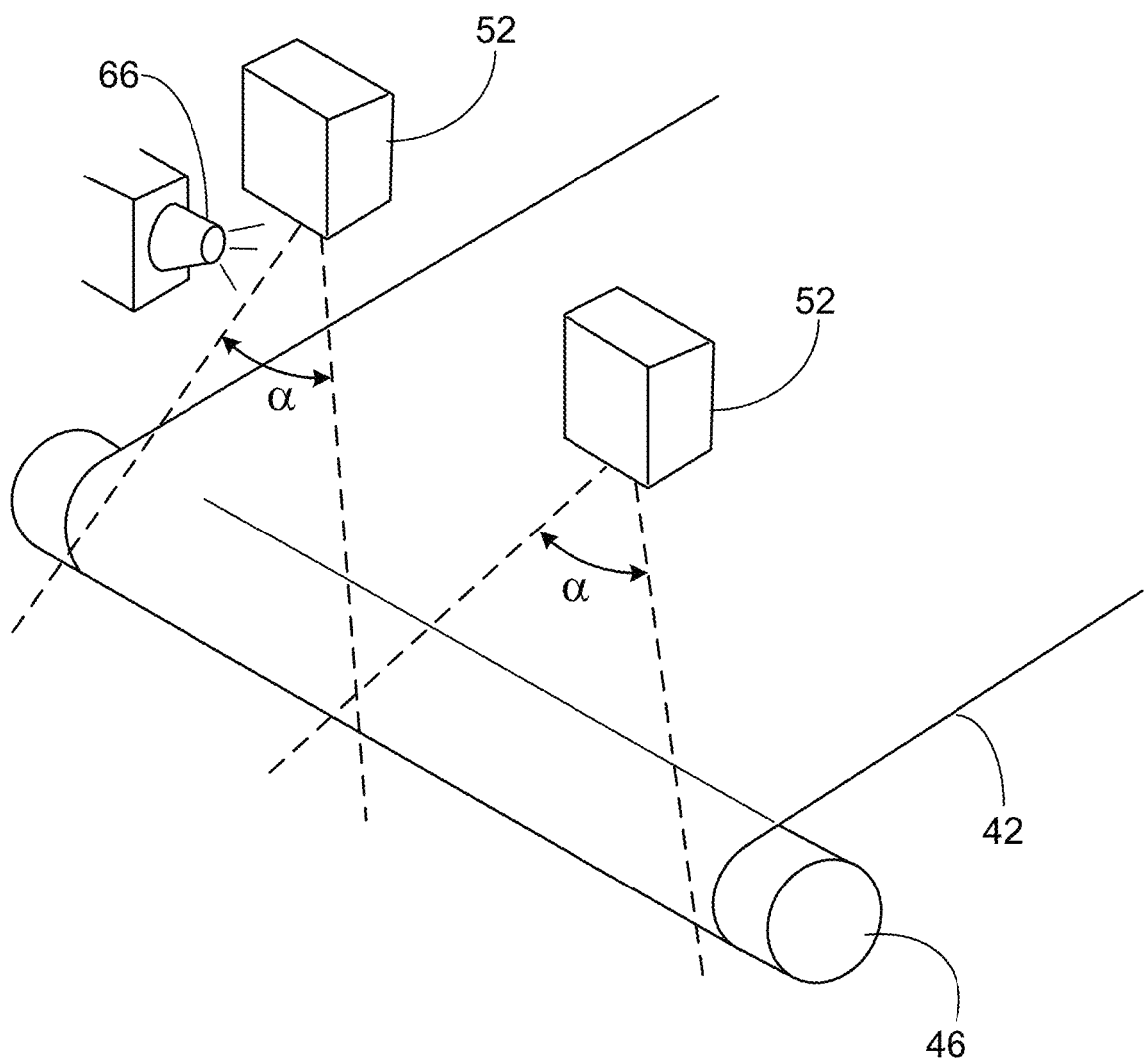
FIG. 6 shows heating distal ends of fibers using multiple lasers sweeping respective widths of the fabric.

Alternatively, one or more lasers 52 can be kept stationary and can be fitted with dynamic optics that cause their beams to sweep through an angle $\alpha$ across a respective width of the fabric, as shown in FIG. 6. In this example two lasers are shown, each heading a respective half of the overall fabric width. The optics of each laser is preferably configured to vary the focal point of its beam during the sweep, such that the focal point remains more or less aligned with the nearest point to the fabric surface. An air nozzle 66 (only one being illustrated) directs a stream of pressurized air toward each laser optics at all times, to keep the optics free of debris and contaminants. Referring back to FIG. 1, a separate air nozzle 66 may be directed toward the web after the lasering process, to help to redistribute headed fibers within the loft of unsheared loops on the fabric surface. The post-heading nips 50$a$ and 50$b$ may also help to push the mushroomed fibers down and among the remaining loops.

Referring back to FIG. 4, a highly localized energy source other than a laser beam can be employed to head the sheared fiber ends. For example, a very hot wire 68 can be positioned to extend parallel to the axis of the heat presentation roll 46, spaced just far enough from the surface of the roll that radiant heat from the wire is sufficient to melt the tips of the sheared fibers without damaging the shorter loops or the base of the fabric. Chilling the presentation roll can also help to reduce the heating effects (from a laser or a hot wire) on the fabric ground and shorter loops. The heat presentation roll 46 may also be stationary and configured with a low radius tip (as with the edge of the shear presentation beam 24 of FIG. 3) projecting toward the heating area, to help project the sheared tips as far from the fabric base as possible for heating.

Figure 7:
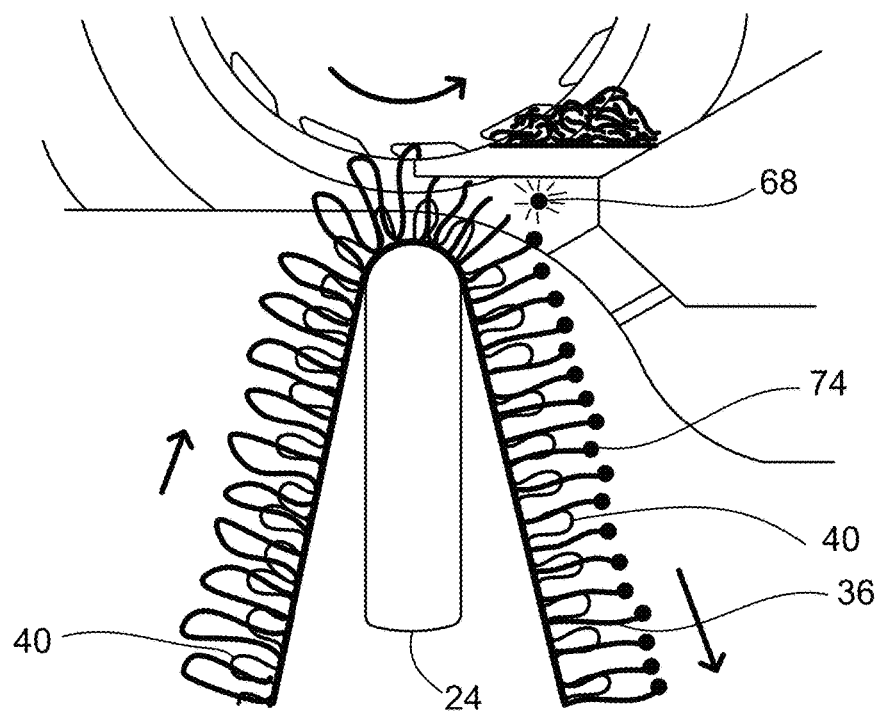
FIG. 7 shows heating distal ends of sheared fibers using a hot wire.

The shearing and heating can take place in close proximity. For example, FIG. 7 shows a hot wire 68 positioned immediately downstream of the shearing and arranged to heat and head the ends of the sheared fibers while the fabric is still supported on the shear presentation beam 24. In this manner, the fabric coming off of the shear presentation beam is essentially finished and ready to be spooled for shipment.

Whatever the localized heating source, it is preferred that the heating take place under conditions that cause the resin of the sheared fiber ends to flow and draw back into a mushroom-shaped head with an essentially hemispherical upper surface and a flat lower surface overhanging all sides of the fiber and generally perpendicular to the fiber. Polypropylene is available as a drawn fiber and is known to mushroom when a cut end is melted, but other drawn amorphous polymer fibers may behave similarly. It is theorized that the pre-draw diameter of the fiber is an upper limit on the size of mushroom head that can be effectively formed.

There are several fiber and process parameters that will affect the shape and size of the resulting head, and optimization of a desired shape for a particular application may require varying one or more parameters. It is theorized that a hollow fiber cross section can improve head formation over a broad range of speeds and temperatures, as the void in the middle of the fiber can provide a space for excess material to flow into during head formation. A smaller fiber draw ratio may cause a fiber to more quickly transition into an elongated or bulbous shape. For some applications, a bi-component (BICO) fiber having a polypropylene core and polyethylene sheath may help in the formation of heads and the fusing of fibers in the fabric base at lower temperatures and/or faster line speeds. With such a BICO fiber, it is preferred that the polyethylene sheath is very thin, so-as to not greatly inhibit the polypropylene core's ability to flow into a mushroom shape. For other applications, a blend of different fiber deniers and resins may be used.

One example of a suitable polypropylene fiber is available from IFG Asota GmbH under the designation CL-10, as a 6 denier solid fiber with a low melt energy. The same fiber is also available as a 17 denier fiber under the same designation. A non-woven fabric may be fashioned entirely of such fiber and then used in the above-described process.

Another suitable fiber is a 7 denier hollow polypropylene fiber, available from FiberVisions under the designation T-118.

Mixtures of fibers may also be employed. For example, a suitable mixture is (by weight) 80% T-118 and 20% 6 denier CL-10. Another suitable mixture is (by weight) 50% 6 denier CL-10 and 50% 17 denier CL-10. Yet another suitable mixture is (by weight) 80% 17 denier CL-10 and 20% 6 denier CL-10.

It may also be beneficial for performance and processing to employ blends of fibers made of different resins. For example, a mixture of (by weight) 80% 17 denier CL-10 and 20% 17 denier polyethylene staple fibers.

Figure 8:
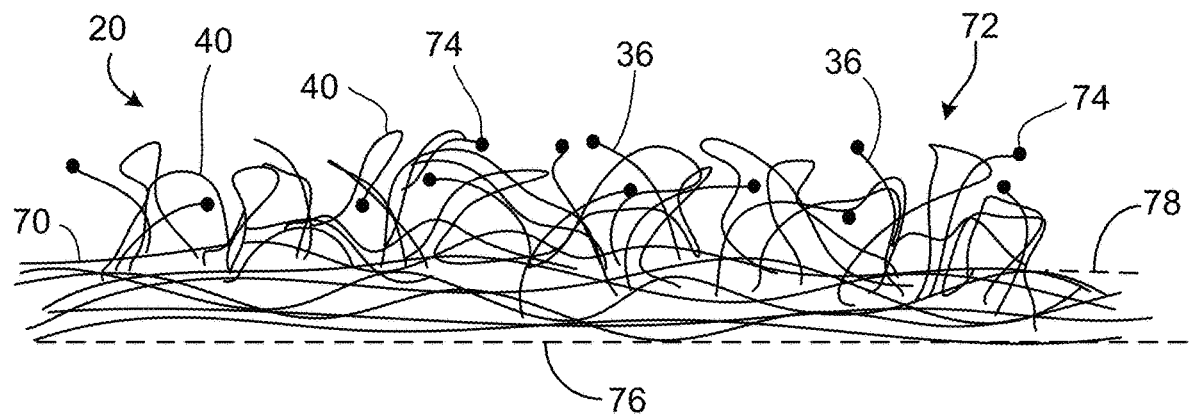
FIG. 8 is a schematic side view of a male fabric touch fastener.

Referring next to FIG. 8, male touch fastener product 20 has a flexible fabric base 70 having a broad side 72, and fibers extending from the broad side of the base, the fibers forming loops 40 of fibers, each loop extending from the base at two spaced-apart points, and fiber segments 36 extending from the base 70 to respective distal fiber ends spaced from the base. Each distal fiber end forms an enlarged head 74 of fiber resin for snagging other fibers. As schematically illustrated, the heads 74 are generally spaced from the non-woven base but at least most are within the loft formed by the full loops 40. Neither the loops 40 nor the fiber segments 36 tend to be straight. The bed of loops 40 is sufficiently dense, and the headed fibers sufficiently fine and flexible, that the overall product retains a particularly soft feel to human skin. The fabric base shown in this illustration is a non-woven material, which may be formed by needling a batt of staple fibers to form a coherent base and extending loops. The longer loops from which the fiber segments 36 are formed may be produced by needling larger-denier fibers into a brush bed, and then introducing and needling in smaller denier fibers to a lower penetration depth. An optional backing or binder layer 76 is shown by dashed line on the opposite side of the base. The loop fibers may optionally be formed by needling the fibers from the base through a supporting film or scrim 78, shown by a similarly dashed line on the loop side of the base. Such a supporting scrim may itself have the loops 40 that remain following shearing. While the product 20 shown in FIG. 8 is configured to releasably engage a loop fastener material having fine fibrous loops, it may also or alternatively be configured for self-engaging fastening, in which the headed fiber segments 36 of one mating fabric surface would releasably engage the loops 40 of the other surface (or of the same surface if folded to overlap itself), and vice versa. In such a case, it is preferable that the fibers from which the male (headed) fiber segments are formed (e.g., from taller loops in a shearing process) be of higher denier than the loops 40 (e.g., the shorter loops in a shearing process).

Alternatively, the fabric base 70 may be of a knit or woven loop fastener fabric. A preferable knit/woven loop material would have upstanding monofilament polypropylene fibers that are not too densely populated. Such a product may have a broad number of applications, especially in the apparel industry.

The male touch fastener products discussed above can be fashioned to releasably engage common microfiber cloth loop materials. One suitable loop material was produced from a 5 dtex×64 mm PP/PET hollow splittable fiber (of a segmented pie construction), available from FiberVisions under the designation PTS850. Following splitting, this produced split fibers having a diameter of between 3.4 and 8.9 μm. Splitting was accomplished by needling with 46 g crown needles from Groz-Beckert. To help with fusing, about 30% by weight of the above-described CL-10 binder fiber was blended prior to carding, needling and fusing. The resulting material engaged well with the above-described male touch fastener product made from T-118 fibers, with some mushroom heads engaging multiple strands of a splittable fiber at a time.

Figure 9:
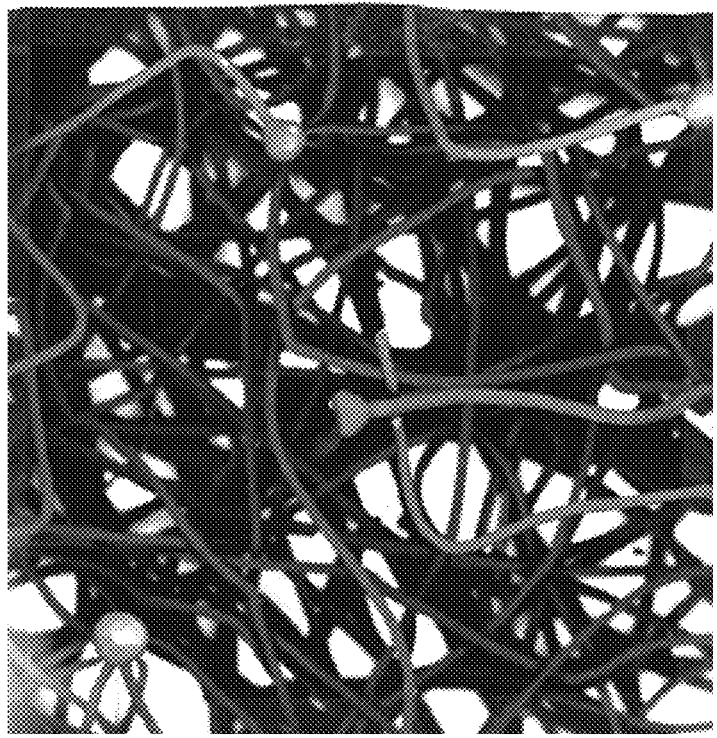

FIG. 9 shows a male touch fastener product made from 6.7 dtex (~35 μm diameter)×40 mm BICO PE/PP solid fibers (PP core, PE sheath, 50/50 ratio) from Beaulieu Fibres International. Heading these fibers by laser formed heads with a head-to-stem diameter ratio of around 2.7:1, but did not mushroom well, likely because of an overabundance of polyethylene material in the sheaths, or a relatively small draw ratio. Although the head shape was not consistent, it provided some engagement against microfiber fabrics.

Figure 10:
FIGS. 9-12 are microphotographs of male fabric touch fasteners.

FIG. 10 shows a head formed by laser heating of a fiber end of a non-woven material formed of FiberVisions T-118 7 denier (approximately 30 μm diameter)×48 mm PP hollow fiber, engaged with a common, commercially available microfiber material (in this case, a microfiber dishcloth). Well-formed mushroom heads had a head-to-stem diameter ratio of 3.5:1 to 4.5:1.

Figure 12:
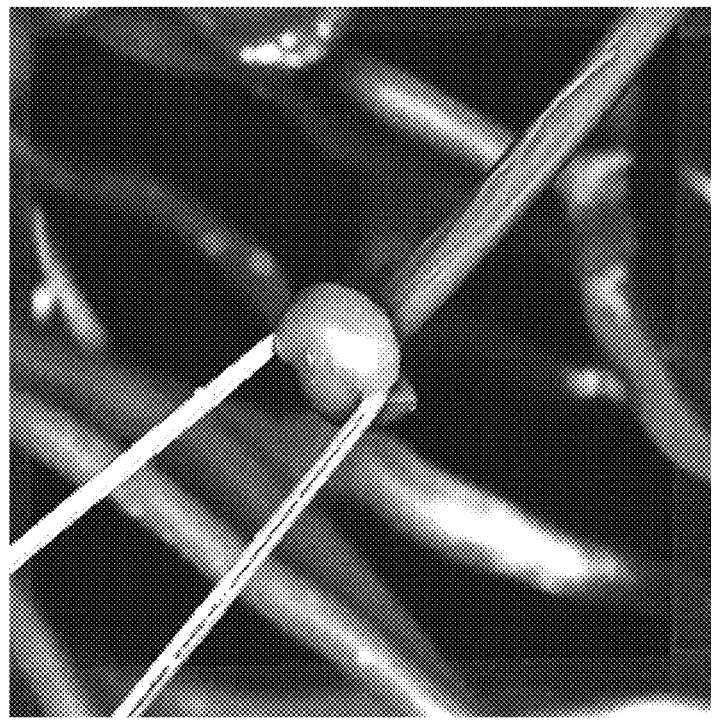
Figure 11:

FIGS. 11 and 12 show a male touch fastener product made from IFG Asota Lv-10D-6, 4.5 dtex (approximately 24 μm diameter)×75 mm polypropylene solid fiber, engaged with the same common, commercially available microfiber loop material as in FIG. 10. The well-formed mushroom heads had a head-to-stem diameter ratio of 3.6:1 to 6:1 that engage well with low denier loops. As seen in FIG. 12, the mushroom head material is sufficiently compliant that loop fibers can get caught on and bite into the overhang of the mushroom head, increasing loop retention and increasing fastening performance.

Another example (not shown) was created using the above-described shearing and laser-heating process described above, but on a knit material formed of monofilament yarn The knit loops were coated to cause them to maintain an upright posture for shearing. The monofilament yarn was composed of polyester. Each yarn was 60 microns in diameter (35 denier). Prior to shearing, the knit product had a basis weight of 345 GSM, with the loops standing to a generally uniform height of 2.5 mm and with a knit base thickness of 0.33 mm. In this example essentially all loops were sheared in the shearing process, such that only cut, standing fibers remained after shearing, and the tips of essentially all standing fibers were melted in the heading process. The formed heads were generally spherical, as opposed to mushroom shaped, due primarily to the polyester fiber composition. To form mushroom-shaped heads, such a knit precursor material could be formed of polypropylene yarn with a high draw ratio (similar to that of the T-118, LV-10, or CL-10 staple fibers).

When I refer to a parameter that requires determining a relative number of loops and heads disposed within a given area of a fabric, I mean as determined by the following procedure:

For knits and woven materials with a pile formed by an ordered array of loops, the loops may be optically counted within a given area, with magnification as needed. The size of the analyzed area should account for any variations in pile structure from repeated pile patterns. The mushroom heads formed on the ends of fiber segments may similarly be optically counted.

Figure 13:
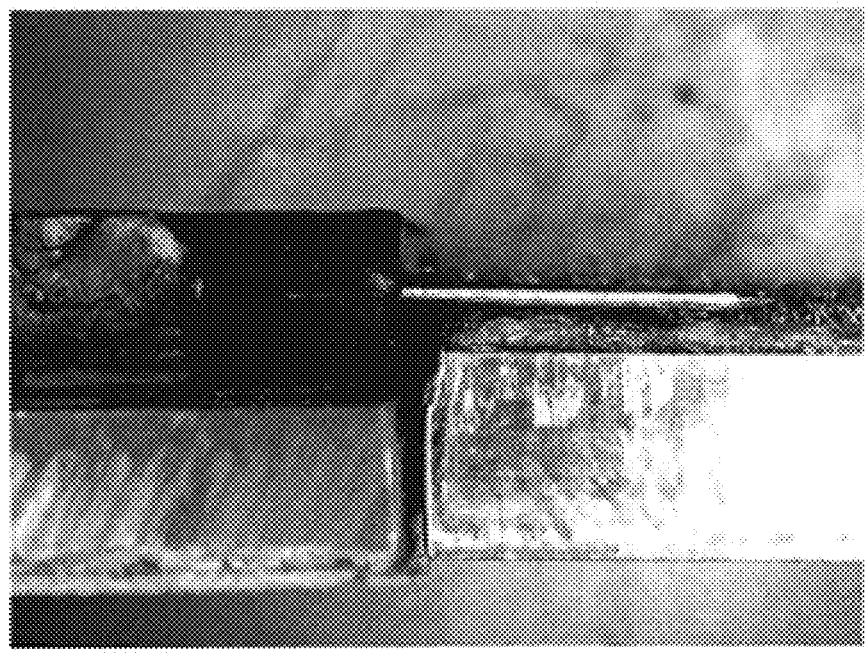
FIG. 13 is a side view of a test used to determine the number of loops and heads within a given area.
Figure 14:
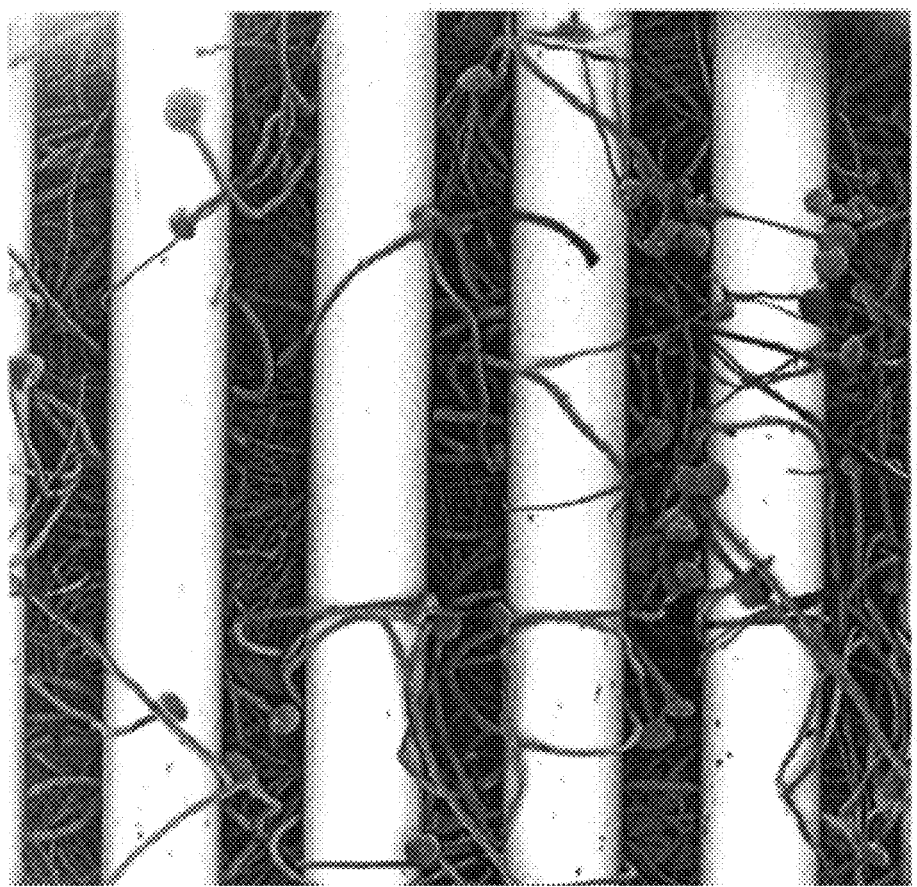
FIG. 14 is an example image of a test area, showing comb tines extending through a loop field.

For non-woven materials and other such fabrics, counting loops requires a statistical test in which a defined comb is inserted laterally into the thickness of the mass of loops, and then the number of loops crossing at least one tine of the comb is counted, again optically. First, samples of the fabric product are mounted to flat rigid blocks using strong tape. The comb is similarly mounted with the tines extending horizontally, such that when the comb is moved toward the mounted fabric the parallel, equally-spaced tines will extend into the space between the fabric base and the distal edge of the loft, with the centerlines of the tines just above the midpoint of the fabric loft, as shown in FIG. 13. The comb has a tine width of 513 μm, a tine spacing of 335 μm, and a tine length of 7.5 mm. The tines each have a tip angle of 26 degrees and a tip radius of 42 μm. Such a comb is available from Sephora as a Pro Brow Comb, part number 21-P313039. With the comb extending into the loop bed in a direction corresponding with the machine or processing direction of the sample, enlarged images are taken in at least five non-overlapped areas spaced from the ends of the tines and the edge of the fabric, in which the tines extend across the entire area. For the non-wovens described above I have worked with areas of 4 mm by 4 mm. An example of such an image, taken with a scanning electron microscope (SEM), is shown in FIG. 14, focused at the tine midplane. If necessary for better visualization of individual fibers using an SEM, the fibrous surface of the fabric can be sputter coated with a very thin conductive material such as gold. The comb is then inserted into the loop bed of another portion of the sample, this time in a direction perpendicular to the machine or processing direction of the sample, and another set of at least five images is taken. For each image, the number of loops or functional loops is determined visually as the number of discrete fiber tine crossings in which a fiber extends completely over at least one tine within the image area, with the fiber extending through two inter-tine spaces. The number of mushroom heads is counted as the number of such heads visible above or between the tines within the image area. These numbers are averaged over the number of images analyzed, and over at least five tested samples.

To determine the percentage of loops left intact through the shearing and heating processes, the number of counted loops is divided by the sum of the number of counted loops and half the counted heads, and then multiplied by 100.

Whether a particular mushroom head is lower than the upper or distal loop portions of a sample can be determined by adjusting the focus of a microscope to bring each into focus, to determine their relative depths within the field of view.

While a number of examples have been described for illustration purposes, the foregoing description is not intended to limit the scope of the invention, which is defined by the scope of the appended claims. There are and will be other examples and modifications within the scope of the following claims.

What is claimed is:

1. A method of making a male touch fastener product, the method comprising:
   shearing distal portions of loops extending from a side of a flexible fabric, leaving fibers extending from the side of the flexible fabric in place of the sheared loops, the fibers extending to respective free distal ends comprising resin, while leaving other loops extending from the side of the fabric intact; and then
   heating the distal ends with energy supplied by a linear energy source while the flexible fabric is curved about a support surface to splay the free distal ends, such that the resin of the distal ends flows to form enlarged heads on the extending fibers, while leaving at least some of the other loops intact;
   wherein the shearing and heating leave intact at least 10 percent of the loops extending from the side of the flexible fabric prior to shearing; and
   wherein as a result of the shearing and heating, at least some of the enlarged heads are spaced below an upper extent of a loft defined by the loops left intact with the flexible fabric in a flat condition.

2. The method of claim 1, wherein the shearing and heating leave intact at least 20 percent of the loops extending from the side of the flexible fabric prior to shearing.

3. The method of claim 1, wherein the sheared loops are of fibers having a denier of less than about 10.

4. The method of claim 1, wherein the enlarged heads have a lateral extent between 2.5 and 6.0 times fiber diameter.

5. The method of claim 1, wherein the flexible fabric comprises an airlaid non-woven material.

6. The method of claim 5, wherein the airlaid non-woven material has a flexible binder layer, and wherein the loops extend through the binder layer.

7. The method of claim 1, further comprising, prior to shearing the distal portions of the loops, forming the flexible fabric by needling a batt of fibers.

8. The method of claim 7, wherein the batt of fibers is needled into a non-woven fabric from one side of the non-woven fabric, thereby forming the loops on the opposite side of the non-woven fabric.

9. The method of claim 1, wherein shearing distal portions of the loops comprises training the flexible fabric about a shear presentation beam adjacent a rotary shear and cutting anvil, such that the loops are engaged by the rotary shear and sheared against the cutting anvil.

10. The method of claim 1, wherein the loops are sheared in two successive stages, with some loops sheared by a first shear, and some other loops sheared by a second shear downstream of the first shear.

11. The method of claim 1, further comprising, prior to shearing the loops, brushing the surface of the flexible fabric to increase a height of the loops.

12. The method of claim 1, wherein the linear energy source is a beam of energy directed toward the distal ends.

13. The method of claim 12, wherein heating the distal ends comprises engaging the distal ends with multiple different beams of energy, each beam engaging different distal ends.

14. The method of claim 12, wherein the beam of energy is pulsed to define alternating beam-on and beam-off periods.

15. The method of claim 1, wherein the linear energy source is a heated wire.

16. The method of claim 1, further comprising, during or after heating the distal ends, engaging the side of the flexible fabric with a flow of air with sufficient energy to deflect the fiber loops.

17. A method of making a male touch fastener product, the method comprising:
   shearing distal portions of loops extending from a side of a flexible fabric, leaving fibers extending from the side of the flexible fabric in place of the sheared loops, the fibers extending to respective free distal ends, while leaving other loops extending from the side of the fabric intact; and then
   heating the distal ends with energy supplied by a linear energy source while the flexible fabric is curved about a support surface to splay the free distal ends, such that resin of the distal ends flows to form enlarged heads on the extending fibers, while leaving at least some of the other loops intact;
   wherein as a result of the shearing and heating the flexible fabric has both headed fibers and functional loops extending from the side of the flexible fabric; and
   wherein as a result of the shearing and heating, at least some of the enlarged heads are spaced below an upper extent of a loft defined by the loops left intact with the flexible fabric in a flat condition.

18. The method of claim 17, wherein as a result of the shearing and heating the flexible fabric has more headed fibers than functional loops extending from the side of the flexible fabric.

19. The method of claim 17, wherein shearing distal portions of the loops comprises training the flexible fabric about a shear presentation beam adjacent a rotary shear and cutting anvil, such that the loops are engaged by the rotary shear and sheared against the cutting anvil.

20. The method of claim 19, wherein the flexible fabric also has other loops extending from the side of the flexible fabric and that are not sheared against the cutting anvil.

21. The method of claim 17, wherein the loops are sheared in two successive stages, with some loops sheared by a first shear, and some other loops sheared by a second shear downstream of the first shear.

22. The method of claim 17, further comprising, prior to shearing the loops, brushing the surface of the flexible fabric to increase a height of the loops.

23. The method of claim 22 further comprising, prior to brushing the surface, unrolling the flexible fabric from a roll.

24. The method of claim 17, wherein the linear energy source is a beam of energy directed toward the distal ends.

25. The method of claim 24, further comprising, while heating the distal ends, directing a stream of air across an optical component from which the beam of energy is emitted toward the distal ends.

26. The method of claim 17, wherein the linear energy source is a heated wire.

27. The method of claim 1, wherein the support surface is a surface of a heat presentation shaft.

28. The method of claim 9, wherein the support surface is a surface of the shear presentation beam.

29. The method of claim 17, wherein the support surface is a surface of a heat presentation shaft.

30. The method of claim 19, wherein the support surface is a surface of the shear presentation beam.

\* \* \* \* \*